Aug. 22, 1939.   J. B. HULL   2,170,244
MAGNETIC TRACK BRAKE
Filed July 31, 1937   2 Sheets-Sheet 1
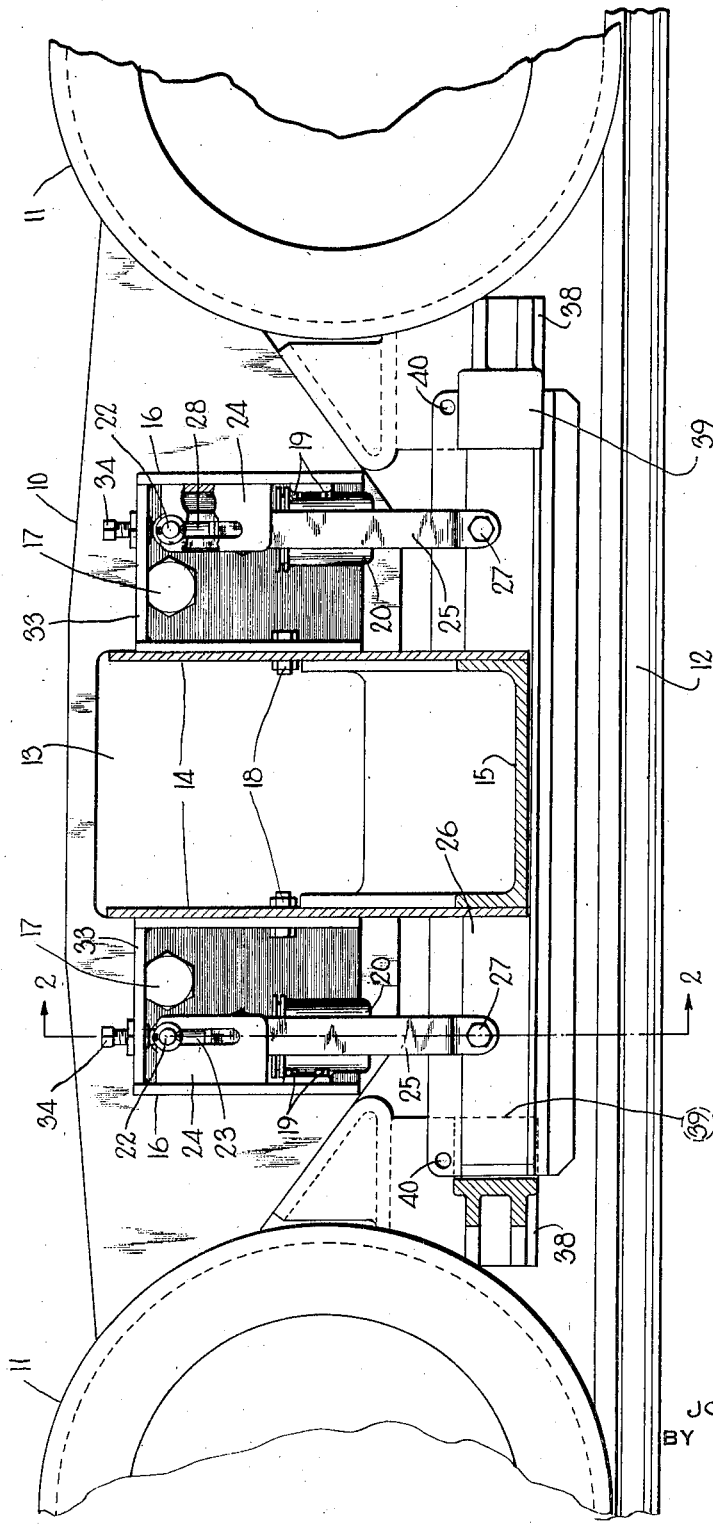
INVENTOR
JOHN B. HULL.
BY *Wm. M. Cady*
ATTORNEY Aug. 22, 1939.    J. B. HULL    2,170,244
MAGNETIC TRACK BRAKE
Filed July 31, 1937    2 Sheets-Sheet 2
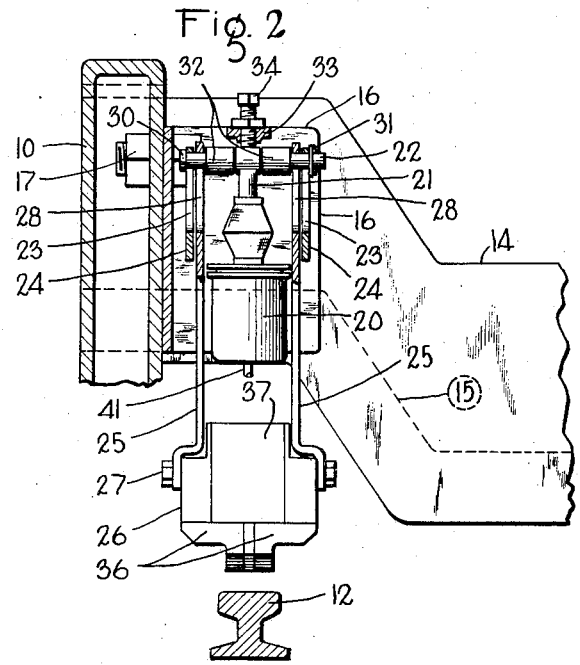
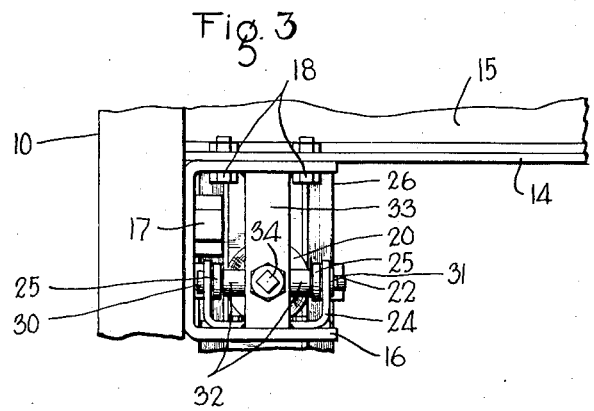
INVENTOR
JOHN B. HULL.
BY *Wm. M. Cady*
ATTORNEY Patented Aug. 22, 1939

2,170,244

UNITED STATES PATENT OFFICE 2,170,244

MAGNETIC TRACK BRAKE

John B. Hull, Berkeley, Calif., assignor to The Westinghouse Air Brake Company, Wilmerding, Pa., a corporation of Pennsylvania Application July 31, 1937, Serial No. 156,721

6 Claims. (Cl. 188—165)

This invention relates to magnetic track brakes, and more particularly to an improved means for suspending a magnetic track brake device from a vehicle truck frame.

A desirable type of suspension mechanism for suspending a magnetic track brake device from a vehicle truck frame is that employing raising cylinders having pistons attached to the track brake device in a manner such that when fluid pressure is maintained within the cylinders the track brake device is held suspended above a track rail, and when fluid pressure is released from the cylinders the track brake device drops by force of gravity to engagement with the track rail. An outstanding advantage of this type of suspension is that the track brake device can be caused to engage the rail before being energized, or concurrently with energization, and as a result the degree of energization can be varied over extremely wide ranges, as an initially high degree of energization is not relied upon or required to effect engagement of the brake device with the rail, such as is the case where a spring type of suspension is employed.

However, when the fluid pressure type of suspension is employed conditions will be encountered occasionally where there is danger of damaging the lifting mechanism. For example, in many municipalities when a fire breaks out on a street upon which railway or traction vehicles travel, the fire hose will in most cases lie across the track rails. In order to permit traction vehicles to pass along the rails under such conditions the fire companies provide what are called "hose bridges". These so-called hose bridges are merely special shapes of iron or steel laid longitudinally of the track rails and provided with holes through which the fire hose passes. They are so shaped that a vehicle may pass over them without damaging the hose.

The hose bridges, as well as similar intentionally placed projections, such for example as cross-overs temporarily placed while repairing old or laying new track, will in conventional brake designs engage the track brake devices as the vehicle passes over them, and in many instances produce damaging strains on the pistons within the raising cylinders. The damage which results not only increases the cost of maintenance, but oftentimes necessitates that the car be taken out of revenue service for an undue length of time. To guard against this it is desirable that a track brake construction be provided which will prevent or relieve such accidental strains.

It is accordingly a principal object of the present invention to provide an improved track brake construction which will eliminate or prevent undue strains being placed on the suspension mechanism incorporated therein due to engagement of the track brake device with projections or obstructions along the track rails.

A further object of the invention is to provide a track brake construction of the type above mentioned, with improved means for adjusting the height to which the track brake device may be suspended above the track rail.

A yet further object of the invention is to provide a track brake construction as hereinbefore set forth, with provision for mechanically holding the track brake device suspended above a track rail in the event that the fluid pressure suspension mechanism should be rendered inoperative to perform this function.

Other objects and advantages of the invention, dealing with improved constructions and arrangements of parts, will be more fully understood from the description of the invention, which is taken in connection with the attached drawings, wherein, Fig. 1 shows an elevation of a track brake construction embodying features of the invention.

Fig. 2 is a view taken along the line 2—2 of Fig. 1.

Fig. 3 is a top plan view of the construction shown in Fig. 2.

Referring now to the drawings, a vehicle truck has been indicated by the truck side frame 10, which is supported by two vehicle wheels 11. The wheels 11 roll upon a track rail 12. The side frame 10 may be supported by the two wheels 11 through any of the common means employed, either with or without intervening springs.

The side frame 10 contains a rectangular aperture or opening 13. Secured to each of the vertical sides of this opening is a transverse plate 14. And as may be best seen in Fig. 2, these plates extend from the side frame 10 on one side of the truck to the like side frame on the other side and embrace a spring platform or plank 15. Each end of this spring plank rests in the opening 13 of a side frame 10, between the plates 14, as may be readily seen in Figs. 1 and 2.

Located on either side of the opening 13, on the inside of the frame 10, are U-shaped brackets 16. Each of these brackets is secured to the truck side frame 10 by means of a bolt 17, and to one of the plates 14 by means of bolts 18 (note Fig. 3 particularly). Each of the brackets 16 has secured thereto, as by bolts 19, a raising cylinder 20. As may be best seen from Fig. 2, the cylinder has operatively associated therewith a piston rod 21, connected to a piston (not shown) within the cylinder 20, which piston rod carries a pin 22 forming a crosshead. Each end of the pin 22 interfits with a slot 23 in a wing of a guide 24, which is secured to the U-shaped bracket 16, as by welding. The guide 24 serves to permit the pin or crosshead 22 to be moved up and down in a vertical direction.

Disposed on the pin 22, near each end, is a link 25 and each link is secured to a track brake device 26 by means of bolts 27. Where the pin 22 passes through each link 25 a slotted opening 28 is provided. The purpose of this opening will be more fully described hereinafter. One end of the pin 22 is flanged as shown at 30, while the other end is so arranged that a washer and cotter pin 31 may be secured thereon, the flange 30 and washer and cotter pin 31 thus serving to maintain the pin 22 in place between the guide members 24, yet permit easy removal. Sleeve members 32 are disposed on the pin 22, on either side of the piston rod 21, for the purpose of centering the piston rod on the pin.

Each of the U-shaped brackets 16 is provided with a top piece 33, which is tapped and threaded directly above the location of the piston rod 21, and is provided with an adjusting screw 34, which, as may be seen from Fig. 1, adjusts the height to which the piston rod 21 and pin 22 may be raised due to operation of the raising cylinder 20.

The track brake device 26, to which the links 25 are attached, may be of conventional design. As is customary in track brake devices, two rail-engaging shoes 36 are provided, preferably spaced from each other by suitable non-magnet spacing material, and an electromagnet 37 is provided for magnetizing the shoes.

For the purpose of transmitting the braking force produced by the track brake device to the truck side frame 10, there is provided at either end of the track brake device, and attached to the truck side frame 10, a guide and thrust member 38. Each of these members is rigidly secured to the side frame 10, and is provided with side portions 39 embracing an end of the track brake device 26, so as to guide the vertical movement of the track brake device as well as take the braking thrust produced thereby.

Although each track brake device may be of conventional design, it is preferred that the casing of each track brake device be so arranged that an aperture or hole 40 may be located near either end of it, and so that when the track brake device is in its raised position the hole will be just above the top surfaces of the side portions 39 of the guide member 38. Thus if it is desired to mechanically hold the track brake device suspended above the track rail, rods may be inserted through the holes 40 so that with the rods resting upon the top surfaces of the side members 39 the track brake device will be mechanically held suspended above the track rail 12.

In operation, when the track brakes are to be released fluid under pressure is supplied to both of the raising cylinders 20, as by way of pipe 41 leading to each cylinder, the control of the fluid pressure being by any suitable means. So long as fluid pressure is maintained in the two raising cylinders 20 to or above a predetermined degree, the track brake device 26 will be held suspended above the track rail.

When it is desired to apply the magnetic track brakes, fluid under pressure is released from the two raising cylinders 20, and as a result the track brake device 26 will drop to engagement with the track rail 12 due to the force of gravity. As the track brake device engages the track rail it may be suitably energized to produce the desired degree of track braking. This control of the track brake device is well understood and need not be described further.

As the track brake device drops to engagement with the rail, the pin 22 moving in the slots 23 guides the downward movement of the track brake device, as does also the guide and thrust members 38. When the track brake device is energized and is producing a braking effect the guide and thrust members 38 transmit this braking effect to the truck side frame 10.

When it is desired to release the track brakes, the track brake device is deenergized and at the same time fluid under pressure is supplied to the raising cylinders 20, whereupon the track brake device will be lifted from the rail to its upper or release position.

The height to which the track brake device is lifted may be adjusted by the adjusting screws 34. Thus if the shoes 36 of the track brake device wear away and it is desired to maintain a substantially uniform gap between the said shoes and the rail, when the track brake device is in release position, this may be done by adjustment of the screws 34.

Now when the track brake device is in its raised position, if the vehicle should pass over an obstruction or projection on the track, such for example as the hose bridges hereinbefore referred to, the rail-engaging shoes 36 may engage this projection and tend to move upwardly. If the links 25 cannot move relative to the pin or crosshead 22, it will be obvious that considerable strain may be produced in the links and pin due to the engagement of the track brake device with the aforesaid projection. This strain is in turn transmitted through the connecting rod 21 to the piston within each cylinder 20. The strain thus produced may be sufficiently great to seriously damage these parts.

Now in order to eliminate the possibility of such damage, each of the links 25 is provided with the aforedescribed slot 28. Thus when the track brake device is in its raised position, and force is applied to the under side thereof, as when striking an obstruction, it will be apparent that the track brake device and its attached links 25 may move upwardly relative to a fixed position of the pin or crosshead 22, without placing stress upon any of the suspension parts. The length of the slots 28 may be so proportioned that this will be true for any of the expected conditions to be met with. As soon as the track brake device passes over the projection or obstruction, it will immediately drop to its normal release position, that is, to the desired or intended height above the track rail.

Attention is also called to the fact that in providing for this flexible arrangement for suspending the track brake device, the suspension parts have been so mounted on the truck side frame as to not interfere with the functioning of the truck in supporting the vehicle body. Thus the U-shaped brackets 16 are located on either side of the opening 13 so as to not interfere with the installation and functioning of the springs or other parts which normally project through this opening.

While the invention has been illustrated with particular reference to a specific type of construction, it is the intention that the invention shall include such modifications as are within the spirit and scope of the appended claims.

Having now described my invention, what I claim as new and desire to secure by Letters Patent, is:

1. In a magnetic track brake system, in combination, a cross-head, bracket means having spaced side walls with complementary slots providing for the movement of said cross-head in said slots in a vertical direction in a straight line, fluid pressure operated means carried by said bracket means for moving said cross-head in a vertical direction, a magnetic track brake device, a plurality of links connecting said cross-head to said track brake device, said links being slotted at the point of connection with said cross-head to permit said track brake device and links to move relative to said cross-head.

2. In a magnetic track brake system, in combination, an element forming a cross-head, bracket means having slotted side walls providing for guiding the movement of said element in a vertical direction, a fluid pressure operated device attached to and embraced by said bracket means for moving said element in said vertical direction, and a pair of links extending on either side of said fluid pressure operated device for connecting said element to a track brake device, each of said links being slotted at the point of connection with said element whereby to permit said links and track brake device to move relative to said element.

3. In a magnetic track brake system, in combination, a magnetic track brake device, a vehicle truck frame, a fluid pressure operated device attached to said truck frame, a cross-head operable by said fluid pressure operated device, means including a U-shaped bracket for guiding the movement of said cross-head in a vertical direction and for embracing said fluid pressure operated device, and links connecting said cross-head to said track brake device, said links being slotted at the point of connection with said cross-head, whereby to permit said links and track brake device to move relative to said cross-head.

4. In a magnetic track brake system, in combination, a vehicle truck frame member, two U-shaped brackets attached to said truck frame member, two raising cylinders each of which is attached to and embraced by one of said brackets, two cross-head members each of which is movable upon operation of one of said cylinders, means carried by said brackets for guiding the movement of each of said cross-heads in a vertical direction, a magnetic track brake device, a plurality of links connecting said two cross-head members to said track brake device, each of said links being slotted at the point of connection with a cross-head member in a direction whereby to permit said links and track brake device to move vertically relative to the position of said cross-head members.

5. In a magnetic track brake system, in combination, a magnetic track brake device, a vehicle truck frame, two U-shaped brackets removably attached to said truck frame, two fluid pressure operated devices each of which is attached to and embraced by one of said brackets, a cross-head operated by each of said cylinders, there being two of such cross-heads, means carried by each of said brackets for guiding the movement of each of said cross-heads in a vertical direction, and four links attached to said magnetic track brake device, two of said links being attached to one of said cross-heads and the other two of said links being attached to the other of said cross-heads, each of said links being slotted at the point of connection with its cross-head whereby to permit said magnetic track brake device and said links to move in a vertical direction relative to the position of said cross-head.

6. In a magnetic track brake system, in combination, a magnetic track brake device, a vehicle truck frame member, two U-shaped brackets attached to said truck frame member, two raising cylinders each of which is carried and embraced by one of said brackets, two cross-head members each of which is operated by one of said raising cylinders, means carried by each of said brackets for guiding the movement of each of said cross-head members, means also associated with each of said brackets for adjustably determining the degree of movement of each of said cross-head members, and a plurality of links attaching said cross-head members to said track brake device, said links being arranged in pairs, each pair of links extending on either side of one of said raising cylinders and within the embrace of said U-shaped bracket and being connected to said track brake device adjacent one end, said links being slotted at the point of connection with said cross-head members whereby to permit movement of said links and track brake device relative to the position of said cross-head members.

JOHN B. HULL.